United States Patent [19]

Michel

[11] Patent Number: 4,967,970

[45] Date of Patent: Nov. 6, 1990

[54] CHOPPING DEVICE FOR FOODSTUFFS

[75] Inventor: Walter Michel, Zollikofen, Switzerland

[73] Assignee: Moha Moderne Haushaltwaren AG, Switzerland

[21] Appl. No.: 360,358

[22] Filed: Jun. 2, 1988

[30] Foreign Application Priority Data

Jun. 2, 1988 [CH] Switzerland ........................ 2133/88

[51] Int. Cl.[5] ............................................ A47J 43/04

[52] U.S. Cl. .................................... 241/169; 241/272

[58] Field of Search ...................... 241/168, 169, 169.1, 241/277, 169.2, 285 R, 100, 272, 282.1, 282.2

[56] References Cited

U.S. PATENT DOCUMENTS 2,140,010 12/1938 Hanel .
2,787,308 4/1957 Popeil .
3,029,851 4/1962 Zysset .
3,933,315 1/1976 Popeil .
4,192,470 3/1980 Hartman .

FOREIGN PATENT DOCUMENTS 2651568 5/1978 Fed. Rep. of Germany .
2719980 11/1978 Fed. Rep. of Germany .
2904535 8/1980 Fed. Rep. of Germany .
313138 5/1956 Switzerland .
528339 11/1972 Switzerland .
580479 10/1976 Switzerland ....................... 241/169
624598 8/1981 Switzerland .
629994 5/1982 Switzerland .
821493 10/1959 United Kingdom .

OTHER PUBLICATIONS

Abstract of 76 17 234, 5—1976.
Abstract of 77 02 152, 1—1977.

*Primary Examiner*—Mark Rosenbaum
*Attorney, Agent, or Firm*—Griffin, Branigan & Butler

[57] ABSTRACT

The invention relates to a device for chopping foodstuffs such as onions and the like, having a housing that may be placed over the items to be chopped and, guided in the housing, a knife that may be pressed downwards against the force of a spring by means of a plunger, the knife being rotated about an angle during its upwards movement through the guide in the housing with a coupling composed of two substantially annular elements (15, 16) disposed concentrically to one another, one element (15) of which presents, on the side facing the second element (16), a number of teeth (24) angled in the same direction and spaced around the circumference of said element, the second element (16) presenting, on the side facing the first, at least two or more resilient tongues (34) meshing into the vertical flank of the teeth (24), the first coupling element (15) being slidably mounted in spiral grooves (8) formed in the housing whereas the second coupling element (16) is mounted rigidly with the operating mechanism (9).

4 Claims, 5 Drawing Sheets

CHOPPING DEVICE FOR FOODSTUFFS

FIELD OF THE INVENTION

The invention relates to a device for chopping foodstuffs, such as onions and other vegetables, having a housing that may be placed over the items to be chopped and, guided in the housing, a knife that may be pressed downwards against the force of a spring by means of a plunger, the knife being compelled to rotate about an angle during upwards movement by the guide in the housing.

DESCRIPTION OF THE PRIOR ART

A chopping device of this type is disclosed, for example, in German patent No. 2719980, the rotation of the knife being achieved in such a manner that the plunger is surrounded by a spring so that the plunger is rotated in a spring during upwards movement of the plunger whereas it is released during the downwards movement, so that it does not cause rotation of the plunger.

BACKGROUND OF THE INVENTION

Conventional chopping devices have a series of disadvantages, one of which consists in the fact that the functioning of the spring is not always reliable and, depending on the cleanliness and cleaning of the device, can become interlocked with the plunger instead of releasing it during the downstroke of the plunger. For this reason many improvements have been proposed regarding dismantling the device so that the complicated mechanism is more easily accessible for cleaning purposes.

OBJECTS OF THE INVENTION

It is an object of the present invention to provide a novel coupling with which a compulsory onward movement of the knife is achieved.

BRIEF SUMMARY OF THE INvENTION

In accordance with the invention this is achieved by a coupling composed of two substantially annular elements disposed concentrically to one another, one element of which has, on the side facing the second element, a number of teeth slanted on one side distributed about the circumference, whereas the second part has, on the side facing the first, at least two or several resilient pawls meshing into the vertical flank of the toothing, the first coupling part sliding in spirally guided grooves of the housing whereas the second coupling part is firmly associated with the operating mechanism.

BRIEF DESCRIPTION OF THE DRAWINGS

An embodiment of the invention will now be described with reference to the appended drawings. There is shown in FIG. 1 a sectional representation of a device of the invention, in FIG. 2 a first part in partial side view and partial section, namely the coupling effecting the unilateral rotation.

DETAILED DESCRIPTION OF THE INVENTION

Figure 1:
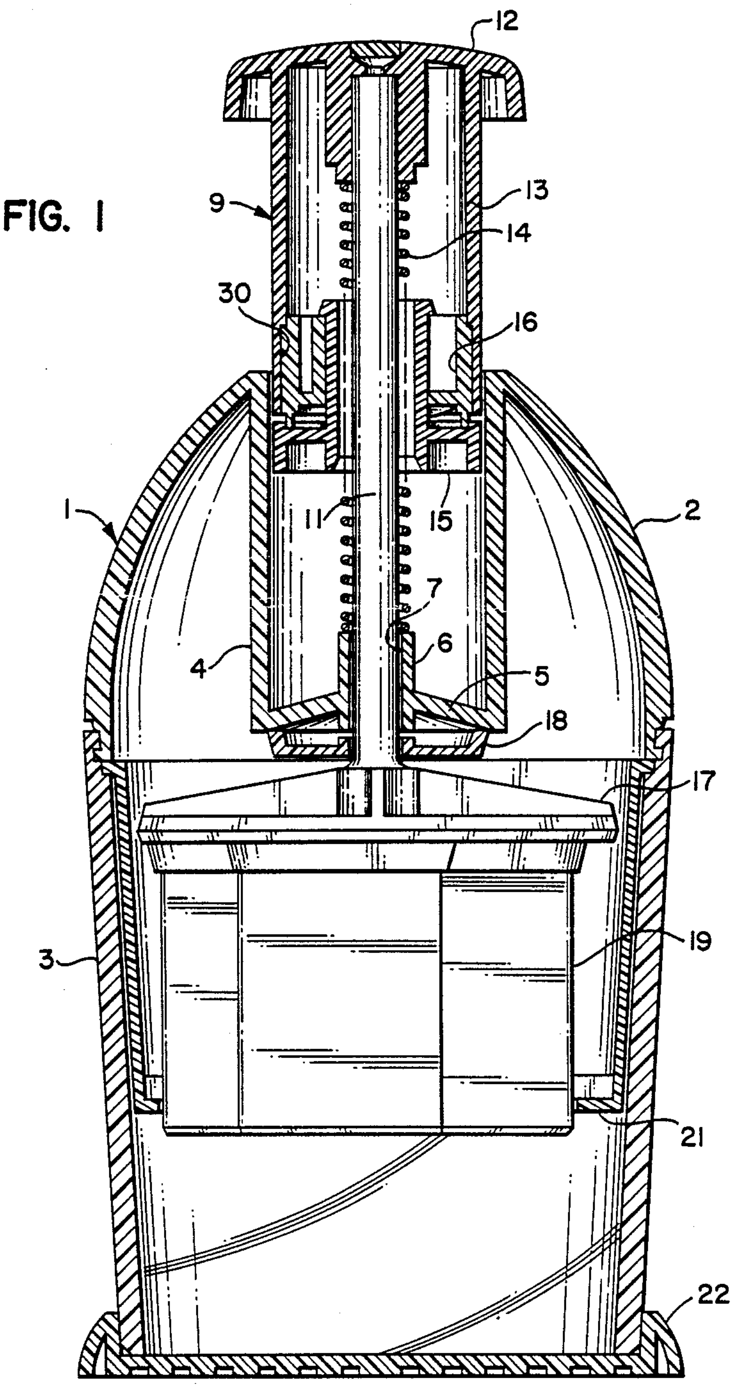
Figure 4:
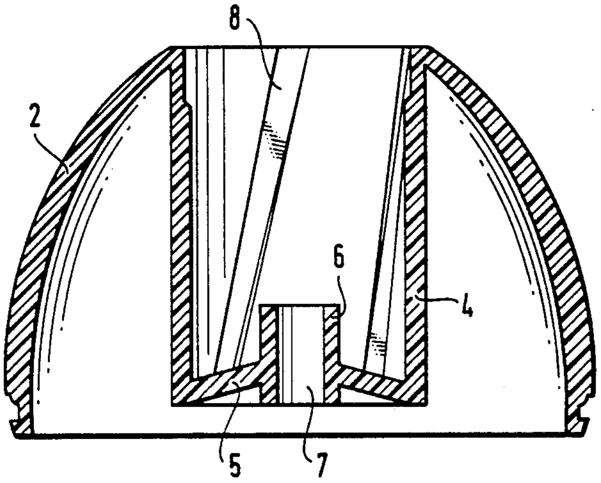
Figure 5:
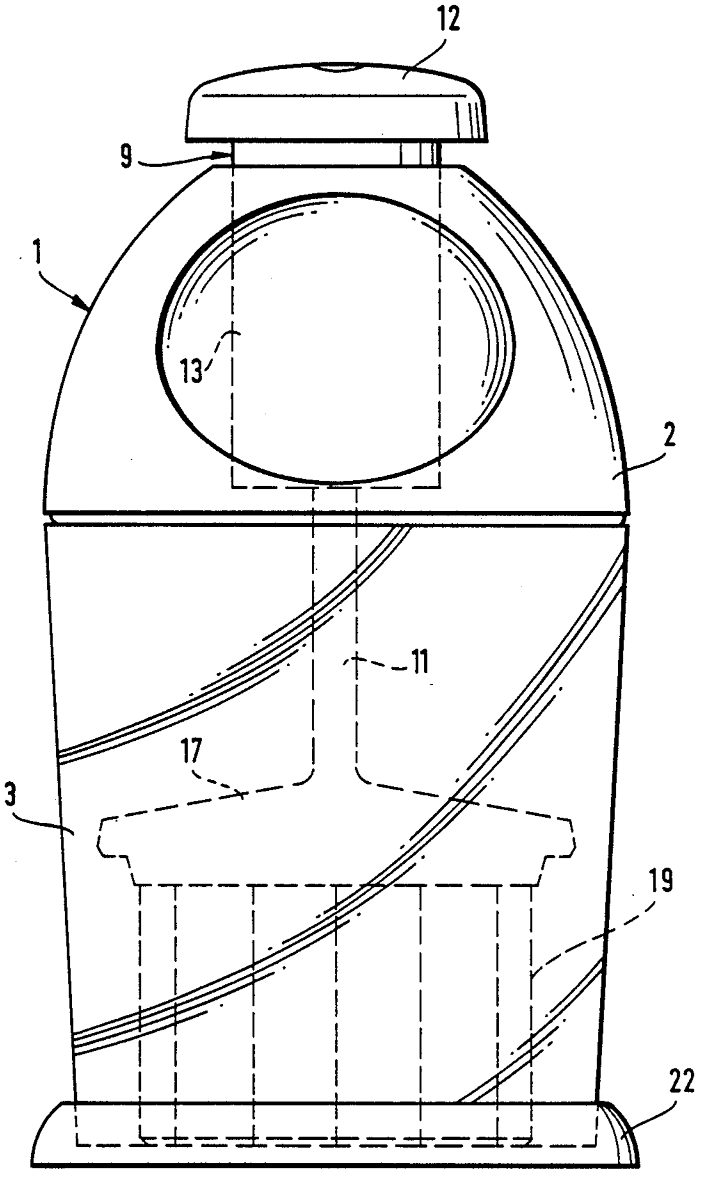
Figure 7:
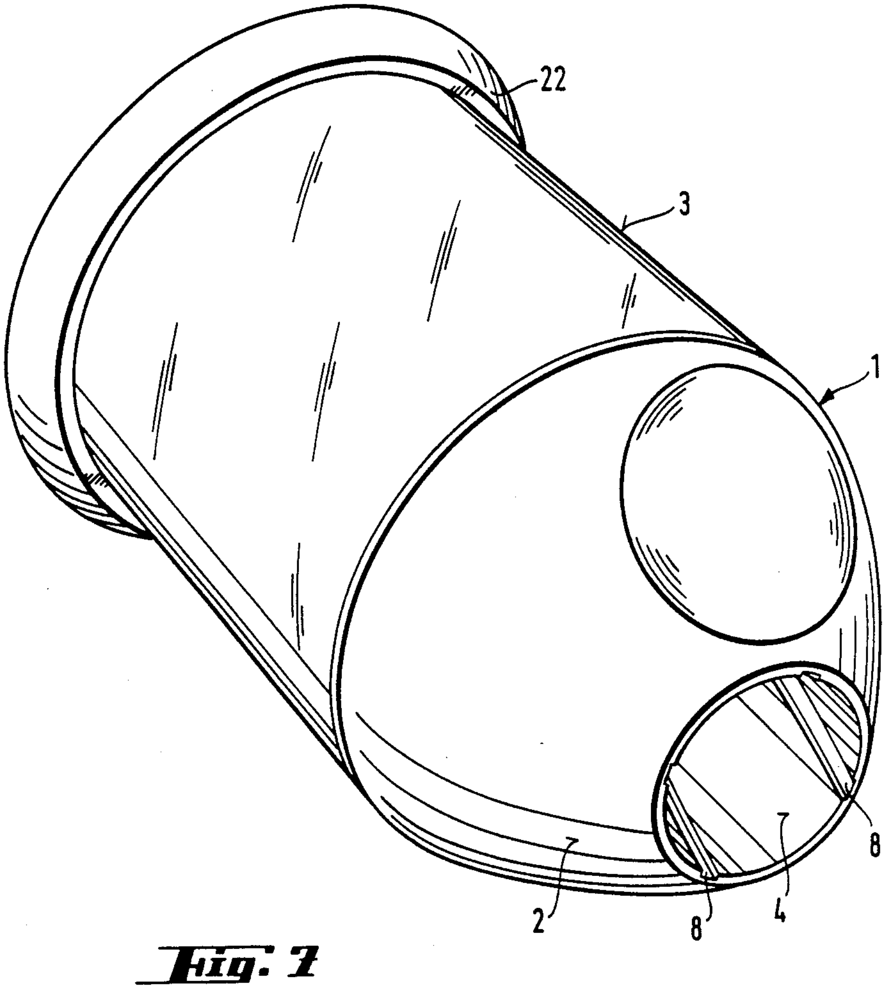

As shown in FIG. 1 the device has a housing 1, which consists of an upper part 2 and a lower part 3. The lower part may be connected to the upper part by means of a bayonet fitting or the like. The upper part of the housing 2 has an upwardly opening chamber which is formed by a cylindrical wall 4 integrally associated with the outer wall of the housing and a base 5. The base 5 has an opening 7 surrounded by a cylindrical lug 6. On its inner surface the cylindrical wall presents spirally disposed grooves 8 as shown in FIG. 4. The chamber formed by the cylindrical wall 4 serves to receive the operating mechanism 9.

The operating mechanism consists of a plunger 11 which is guided in the opening of the chamber base. The plunger 11 is firmly associated with a push-button 12, which presents a cylindrical downwards elongation 13, the outer diameter of which corresponds to the inner diameter of the chamber. The push-button is guided in this manner in the chamber.

A spiral spring 14 is located between the chamber base and the push-button which presses the push-button upwards together with the plunger.

On the underside of the cylindrical elongation of the push-button there is a two-part coupling 15, 16, which will be described in greater detail below.

A knife holder is secured to the lower end of the plunger. Between the knife holder 17 and the chamber base there is a shock absorber 18. A substantially conventional, rippled or convoluted chopping knife 19 is secured in the knife holder.

In addition a substantiallY conventional scraper 21 is provided which can also be removed on dismantling the housing into upper and lower part. Finally, a chopping plate 22 is located on the lower side of the lower part of the housing 3 onto which the housing is placed.

Figure 2A:
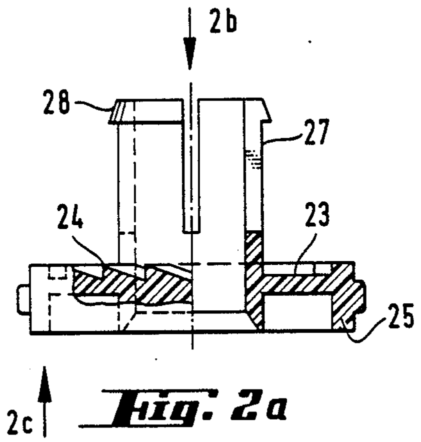
FIG. 2*b* and FIG. 2*c* are, rspectively, a top view and a bottom view of FIG. 2*a*, in FIG. 3*a* the second part of the coupling shown in partial side view and partial section as taken along lines 3*a*—3*a* of FIG. 3*b*, in FIG. 3*b* the second part of the coupling shown in a top view.
Figure 2B:
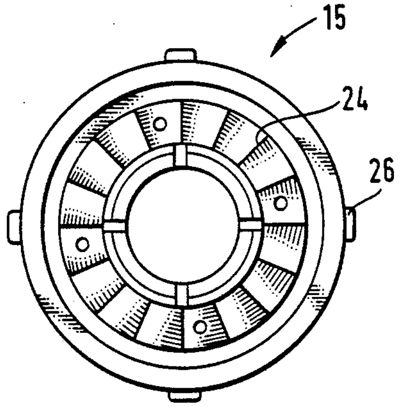

The exact design and function of the coupling is shown in FIGS. 2*a*, 2*b*, 3*a* and 3*b*. The coupling consists of two parts 15, 16, which are, however, fitted together and rotatable about each other, although only in one direction. The first part 15 is shown in FIG. 2*a* and 2*b*, FIG. 2*a* showing a partial side view cross section and FIG. 2*b* a plan view. As may be seen from FIG. 2*a*, the first coupling part 15 has a flat washer 23 which is provided on its upper side with teeth 24 that slant in one direction, the other side being provided with steep abutments. Sixteen teeth are arranged about the circumference of the washer 23 so that each tooth corresponds to an angle of 22.5 degrees. On its outer periphery the washer has a cylindrical lug 25 which is provided with four cylindrical cams staggered against one another about 90 degrees. The diameter of these cams is 3.5 mm and thus corresponds to the width of the spiral grooves 8 in the chamber wall.

On its inner side the washer 23 has a long, upwardly directed cylindrical lug 27, the inner diameter of which is larger than the outer diameter of the plunger 11. The upper side of the lug 27 has a widened part 28 which slopes conically upwards and which forms a downwards facing stop by the aid of which the two coupling parts are held together. The height of the cylindrical lug 27 corresponds to the height of the second part of the coupling to be described below.

Figure 3A:
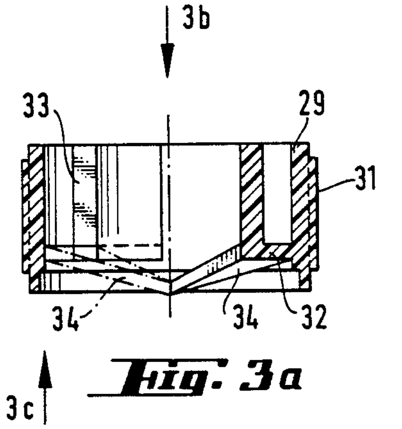
FIG. 3*c* shows a bottom view, in FIG. 4*a* detail, of the upper part of the housing, in FIG. 5 a view like FIG. 1 except not in section, showing knife 19 extended, in FIG. 6 a bottom plan view taken from FIG. 5 with bottom plate 22 removed, in FIG. 7 an elevated perspective view with portions removed showing the spiral, spine grooves 8 in cylindrical wall 4.
Figure 3B:
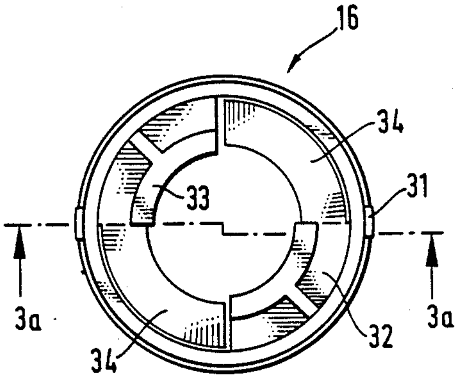
Figure 2C:
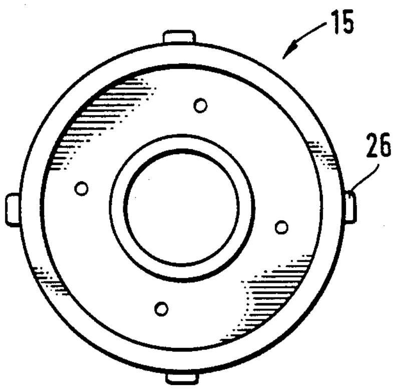
Figure 3C:
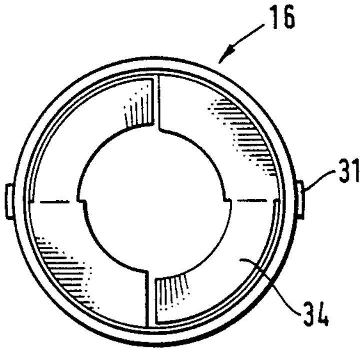
Figure 6:
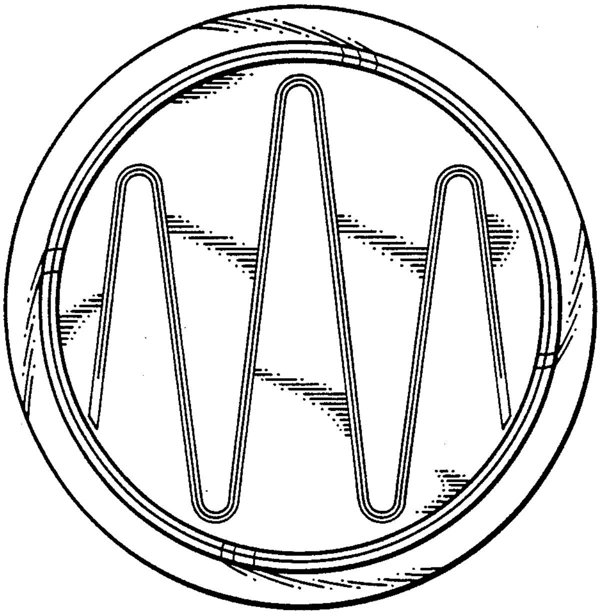

The second part of the coupling is shown in FIGS. 3*a* and 3*b*, FIG. 3*a* showing a combination of section and sectional drawing and FIG. 3*b* a plan view. It should be noted that the section shown in FIG. 3*a* is not taken straight, but is partly curved.

The second coupling element 16 consists substantially of a cylindrical outer wall 29 which is provided with two opposite, axis parallel projections 31. These projections 31 serve to insert the second coupling part 16 into the corresponding grooves 30 in the inner wall of the elongation of the push-button 12. Integrally associated with the cylindrical wall 29 are base sections 32, whereby these base sections are disposed at an angle of 90 degrees to each other. These base sections are, in turn, provided with upwardly directed lugs 33 also comprising an angle of 90 degrees the height of which corresponds to the lug of the first element up to the stop of the widened part. The distance between these two quarter cylindrical lugs 33 corresponds to the outer diameter of the lug of the first element.

The base elements continue in each case in tongues or pawls 34 extending over 90 degrees that are not associated with the outer wall 29 and slope in a downwards facing direction. As a result of the properties of the material, these tongues can provide resilience upwards. These tongues are so shaped that they mesh with the steep flanks of the teeth 24 when the two coupling parts are assembled.

The function of the coupling is as follows. When the push-button is pressed downwards manually, the lower part of the coupling is rotated about the spiral-shaped grooves. However, since the push-button is held by the hand executing the pressure and cannot turn the upper coupling part with the tongues slides past the sloping surfaces of the teeth. On release, i.e. with the upwards movement of the plunger and of the push-button the meshing of the tongues into the steep flanks of the teeth makes mutual rotation of the two coupling parts impossible. As a result of the forced rotation of the first coupling part due to the spiral-shaped grooves the button, the plunger and hence the knife are rotated. Each rotation equals 22.5 degrees; a complete revolution being effected after sixteen operations.

The conventional plastics materials are suitable materials for the device. The coupling preferably consists of polyoxymethylene (Delrin$^{R}$). Other materials that are friction-resistant and display the requisite resilient properties are also suitable.

I claim:

1. A device for chopping foodstuffs, having a housing that may be placed over the items to be chopped a guide in the housing, a knife within the housing that may be pressed downwards against the force of a spring associated therewith by means of an operating mechanism having a pressure handle and a plunger, the knife being rotated about an angle during its upwards movement through the guide in the housing, characterized by a coupling composed of two substantially annular elements (15, 16) disposed concentrically to one another, a first said coupling element (15) of which presents, on the side facing a second said coupling element (16), a number of teeth (24) angled in the same direction and spaced around the circumference of said first coupling element, the second coupling element (16) presenting, on the side facing the first coupling element, at least two resilient tongues (34) meshing into a vertical flank of the teeth (24), the first coupling element (15) being slidably mounted in spiral grooves (8) formed in the housing whereas the second coupling element (16) is mounted rigidly with the operating mechanism (9).

2. A device according to claim 1 characterized in that the coupling first and second elements (15, 16) are on one side ratably associated with one another.

3. A device according to claim 1 characterized i that a part (13) mounted rigidly with the operating mechanism (9) is provided with axis spiral grooves substantially parallel to the axis of movement of the operating mechanism whereby said second coupling element has projections perpendicular to the axis of movement slidably mounted in said spiral grooves.

4. A hand-operated vegetable chopper of the convoluted blade type whereby the blade rotates through an angle after each downward cutting stroke wherein a coupling is provided between a housing of said chopper and a blade section, said coupling having two substantially annular elements disposed concentrically to one another, a first said element having on the side facing the second element a number of teeth all angled in the same direction and spaced around the circumference of said first element, the second element presenting, on the side facing the first element, at least two resilient tongues meshing into a vertical flank of the teeth, the first coupling element being slidably mounted in spiral grooves formed in the housing whereas the second coupling element is mounted rigidly with an operating mechanism.

* * * * *